Patented May 12, 1942

2,282,798

UNITED STATES PATENT OFFICE 2,282,798

STABILIZATION OF FOODS AND OILS

Sidney Musher, New York, N. Y., assignor to Musher Foundation Incorporated, New York, N. Y., a corporation of New York No Drawing. Application November 27, 1939, Serial No. 306,325

8 Claims. (Cl. 99—163)

The present invention relates to the preparation of antioxygenic materials and it particularly relates to the preparation of antioxygenic concentrates from cereal materials.

It has been found that antioxygenic materials may be extracted by water and/or alcohol from unbleached cereal flours, leaving a residue substantially devoid of antioxygenic materials said extract capable of exerting an antioxygenic effect upon aqueous oxidizable compositions.

It has now been found that new antioxygenic materials may be obtained from cereals which may already have been subjected to water extraction where such cereals have been subjected to a sprouting and germinating operation until the germ has been substantially enlarged and germinated. Preferably, during this process there is a development of diastatic enzymes but it is important that such diastatic enzymes be not permitted to convert a major portion of the starch present in the cereal to sugar.

The water soluble extract of such germinated or sprouted cereal which is extracted by a slightly acidified water and at a temperature between about 125° F. and 145° F. and which either before, during or after extraction is rendered substantially free of diastatic enzymes is found to be high in antioxygenic effectiveness and to have an enhanced effect particularly when subjected to elevated temperatures after addition to oxidizable compositions and particularly to glyceride oil containing aqueous compositions.

It has been found that the best results are obtained from germinated or sprouted maize and oats and it is important that the extract be produced or treated in such a way as either to kill or deactivate the diastatic enzyme which may have been produced during the germinating or sprouting process.

It is quite important that the extract after preparation from the germinated maize or oats be concentrated to between 40% and 75% total solids or more and it is desirable at some point during the evaporation process or before or after such evaporation for the extract to be heated to a temperature of at least about 190° F. in order to kill off the diastatic enzymes and also to render the product more sterile.

The temperature of extraction can be between 125° F. and 145° F. provided the diastase has already been killed off in the sprouted or germinated cereal. However, where there still remains any diastatic action in the germinated or sprouted cereal, the extraction should proceed for the shortest possible time such as for less than 30 minutes at a temperature of not in excess of about 115° F. and preferably at room temperature. It is, however, particularly desirable for the germinated or sprouted cereal to be heated in its moist condition to a temperature sufficiently high to inactivate the diastase and then to extract.

The preferred concentrated extract should contain less than about 60% of sugar against the total solids weight of the concentrated extract and preferably less than about 45%. It has been found that a high sugar content in the extract not only appears to reduce the antioxygenic effectiveness of the antioxidant materials present, but also the excessive enzyme action of the diastase in producing such large concentrations of sugar appears to be quite disadvantageous in obtaining a satisfactory antioxygenic effect and material.

In order to avoid these undesirable results, the starch content of the germinated or sprouted cereal should not be reduced by more than about 30% against the original amount of starch contained in the cereal before germination and diastatic action should be stopped or the extraction should take place before there is any further conversion of the starch into sugar. Under these circumstances, the germinated or sprouted cereal at the time of extraction will contain between about 35% and 50% or more total starch which should be permitted to remain in the cereal during the extraction procedure.

As an example of the method of preparing such diastase-free antioxygenic material from corn or maize, the whole corn is first soaked in water after sorting and cleansing for a period of about from 48 to 120 hours and at below room temperature.

The water is changed about every 12 to 20 hours in order to avoid any fermentation of the materials which are extracted from the ungerminated corn.

The first and/or second steep or soaking water, desirably in unfermented condition, which is removed from the ungerminated cereal may be evaporated or concentrated to produce an antioxygenic material to which, however, this invention is not particularly directed, the present invention being particularly directed to a novel antioxygenic material which is produced following the sprouting or germinating and after the water soluble materials contained in the ungerminated cereal have been extracted.

This soaking procedure is continued until the corn takes up about between 40% and 60% of its weight of water. The thoroughly soaked corn is then removed from the water and placed in layers as thick as, say, about 12 inches to 18 inches and permitted to germinate at a temperature of about 60° F. to 80° F. for a period of, say, from 5 to 10 days. During this period the thickness of the layers may be decreased to as little as 2 inches to 5 inches and the corn may be turned over from time to time in order to expose the individual grains of the corn to air. Moreover, during this period the corn may be kept moist by sprinkling water thereon.

This germinating process is continued until the sprout is from one-quarter to the full length of the corn kernel itself.

The resultant sprouted or germinated corn may then be directly extracted after grinding into a fine state of division or such sprouted cereal may first be dried and even kiln dried to destroy a substantial part of the diastatic enzymes contained in the sprouted cereal before extraction.

The sprouts may where desired be removed by running the corn over sieves to separate the sprouts from the remainder of the sprouted cereal.

It has been found that a greater proportion of the diastase is killed off by heating the germinated cereal while still moist to over about 180° F. and preferably to about 200° F. but care must be exercised that the starch contained in the germinated cereal is not gelatinized during this heating procedure.

The substantially diastase-free sprouted or germinated cereal such as corn in a fine state of division is mixed or agitated thoroughly with a quantity of water for a period of about 30 minutes at a temperature of 135° F. The time of agitation may vary from 5 minutes to 1 hour but in order to obtain the maximum yield and the most desirable product, the time period for continuous agitation should be between about 30 minutes and 45 minutes.

The temperature of the water at the time of the extraction should not be in excess of about 140° F. to 145° F. in order to avoid conversion and gelatinization of the starch, both of which are undesirable in the production of the desired extract. The water temperature should also not be less than about 125° F. to 130° F., as a difference of as little as 10° in the temperature of the water used for extraction may account for a 30% to 60% loss in the yield of the water extract that is obtained.

The water used should be substantially free of minerals and desirably free of iron and copper. Where the water normally has a pH above 7.0, it should be acidified to reduce the pH. Preferably, in order to obtain a clear supernatant water containing the extract, and to obtain the most desirable type of extract, the pH of the water should be adjusted to between 4 and 7 and preferably to about 5 to 6 by addition of a mineral acid such as hydrochloric, sulphuric or phosphoric, or an organic acid such as acetic, tartaric, citric, etc., or by the addition of acid salts such as acid sulphates or phosphates. This adjustment may take place during or before the extraction. The pH adjustment will also serve to increase the rate at which insoluble material will settle out leaving a clear supernatant water portion containing the extract.

Any quantity of water may be used to produce a free flowing mixture. One part of corn should preferably be mixed with about 5 parts of water by weight. Other proportions may also be used such as from 4 to 15 parts of water to every 1 part of corn.

Another very satisfactory method is for the cereal to be ground or milled with sufficient water to produce a paste and whereby the cell structure of the cereal is so broken into as to permit the maximum solubility of the water extractable substances into the water. Then the pulpy aqueous mass may be pressed or centrifuged or otherwise treated to remove the aqueous solution containing the extract. Preferably the same temperature and acidity are employed as above. The solution may be clarified or filtered or where additional water is added, allowed to settle out.

Where the corn-water suspension is allowed to stand for settling out, and after the 30 minute agitation and extraction period, the solution should desirably be cooled by placing it in a jacketed or coiled vat or by running water through cooling coils immersed therein or by adding cold water to the hot corn-water suspension, so that the temperature of the water is reduced from 135° F. to from 80° F. to 105° F. and preferably to about 100° F. in order to avoid fermentation during the settling period. The solution thus cooled may then be treated to remove the undissolved starch, fibrous and other cereal insoluble portions. This may be accomplished by allowing the solution to settle for from 2 to 12 hours until a substantially clear unfermented supernatant liquid is formed which liquid is removed by decanting, siphoning, or similar process.

The solution containing the corn may also be subjected to a continuous centrifuging whereby all undissolved material is removed as a continuous operation.

The substantially clear solution thus obtained should desirably be evaporated by vacuum distillation at about 135° F. to approximately between 45% and 75% solids and desirably to about 70% solids and to a Baumé of 37°. After the proper solids content has been reached, the extract should desirably be subjected to superheated steam in the vacuum pan in order to raise the temperature of the extract to 200° F. for about 10 minutes in order to sterilize it and also retain its full stabilizing properties for longer periods.

The evaporating temperature may vary, dependent upon whether vacuum or atmospheric pressure is used. Although it is desirable to use vacuum evaporation, evaporation at atmospheric pressure may also be employed.

The concentrated extract may also be packed in cans or other containers and sterilized at 220° F. to 250° F. for 10 to 30 minutes.

Where, due to prolonged sterilization or high heat during such sterilization, a coagulation or precipitation is formed resulting in the production of insoluble matter, such precipitate may be filtered or otherwise removed. Distilled or softened water is desirable as the extracting medium and will avoid, to a large degree, such precipitation and coagulation.

It is not desirable to concentrate the water extract down to in excess of 75% solids in the vacuum pan, as otherwise darkening and caramelization of the extract occurs.

Where drying is desirable, the concentrated water extract may be dried on trays, preferably under vacuum and a desirable dried product will be obtained. Drum drying is difficult in view of the mucilaginous nature of the extract by means of which the extract adheres to the drum and cannot readily be scraped off. Spray drying may less preferably be resorted to in view of the oxidation occurring during the spray drying operation.

Where desired, a carrier may be employed in the drying of the concentrate. For example, the concentrated water extract may be mixed with condensed skim milk on the basis of using from 10% to 60% by weight of the extract (on its solids basis) against the solids weight of the skim milk and the thoroughly mixed combination of the concentrate and skim milk dried on a drum drier or otherwise dried. The skim milk absorbs the gummy characteristics of the concentrate and permits much easier drying than where the concentrate is dried alone. Other carriers may also be employed such as salt and sugar, for example, dependent upon the use to which the extract is eventually to be put.

The extract may very desirably be mixed with milk, preferably skimmed, in concentrated form, and using from 10% to 60% of the extract and 90% to 40% of the milk, based on the solids weight, and then drying the ingredients together, whereby there is obtained a combined action of the milk ingredients with the extract to further increase the stabilizing action of the extract. The drying may be done preferably on a hot roll and the dried film scraped off after drying. Less preferably the mixture may be dried by spraying into a heated chamber.

The extract may also be mixed with powdered or crystallized salt or sugar using from 1% to 20% of the extract and 99% to 80% of the salt or sugar and preferably applying the concentrated extract to the sugar or salt crystals by spraying such extract on the crystals while they are kept at above 180° F. and desirably at between 250° F. and 300° F. so that the extract dries on the surface of the crystals of the salt or sugar.

For example, as the salt crystals leave the kiln at 275° F., the extract containing 30% water may be heated to 170° F. and sprayed on the salt crystals, applying 2% on the solids basis to the salt in this manner, thereby obtaining a completely soluble product. The extract may be applied to sugar such as to refined cane or beet sugar or to dextrose at the centrifugals to obtain complete admixture with and absorption upon the sugar crystals. In all cases the final extract should be free of starch and cereal fibres.

The concentrated sprouted cereal extract obtained in accordance with this invention has wide antioxygenic properties and may be satisfactorily used for the preservation of organic materials subject to oxidative deterioration and particularly of oxidizable glyceride oil containing aqueous compositions.

The extract is desirably used in curing operations such as in the curing of meats and fish and particularly fatty meats and fish, such as bacon, mackerel, sardines, salmon, tuna fish, etc. The extract is used in an amount of between about 2% and 15% on the basis of its total weight against the weight of the salt used in the brining operation in order to retard oxidative deterioration of the brined cured meat and fishery product.

The extract may also be desirably utilized in the dairy industry and particularly for addition to cream before pasteurizing and where the cream is then churned to produce butter, the butter being substantially free of the added extract but nevertheless improved in keeping quality and stabilized against oxidative deterioration. When added to cream, the extract is used in an amount of between 0.1% and 1% against the butterfat weight of the cream and is preferably added to the cream before the cream is pasteurized and churned.

The extract may also be used to retard oxidative deterioration of the fruit ice creams and particularly of strawberry ice cream where the extract is added to the ice cream before pasteurizing in an amount of between 0.05% and 0.5% and thoroughly admixed therein.

The extract may also be applied to roasted coffee and desirably is applied to the coffee beans in the roasting cylinder while the coffee beans are at the high temperature of roasting and immediately following the roasting operation.

Where the extract is added to the aqueous continuous phase of an oil containing emulsion and the emulsion then broken to release the oil or fat globules contained in dispersed form therein, such globules are nevertheless stabilized even though the stabilized oil or fat globules are substantially free of the added extract. This is particularly evident where such emulsion is, after addition of the extract thereto, heated to an elevated temperature to enhance the antioxygenic effect.

The extract may also be added to sizing baths used for the sizing of textiles, paper, board and similar products where they contain either oil or other organic materials subject to oxidation or where such oxidizable organic compositions are added to them during processing or sizing. The extract may also be utilized for addition to cereals, cereal flours, seed flours, starch and skim milk for powdering in order for those materials to serve as carriers for the concentrated extract and to retard oxidative deterioration of the carriers themselves.

Less than 5% of the extract on its solids basis against the weight of the oxidizable organic composition will generally give the desired preservative effect and in most instances less than 2% of the extract will be sufficient. The extract should desirably be thoroughly dispersed throughout the body of the organic composition to be stabilized.

It has been particularly found that where the extract is added to an organic material subject to oxidation and that organic material containing the extract thoroughly dispersed therein subjected to an elevated temperature in excess of about 170° F. and desirably to about 250° F. or above, a marked acceleration or increase in preservative effect will be obtained.

For example, the extract may be added to chopped hog fat and the chopped hog fat then rendered at a temperature of about 250° F. or above, or the extract may be added to cream which is then heated to about 180° F. and churned to produce butter.

It is not known as to exactly how the antioxygenic effect is enhanced as a result of the elevated temperature treatment or whether the effect is due to chemical or catalytic action.

Where desired, the grain may be fortified before sprouting or germinating with a small quantity of a nutrient such as yeast, organic phosphates, etc.

Although corn is given as the preferred example, it is also possible to prepare the substantially diastase-free extract of other sprouted or germinated cereals such as of wheat, rye and barley.

It is possible to obtain a combined antioxygenic concentrate by combining together the first and/or second steep water or soaking water used for the first steeping or soaking of the cereal before the germinating process has been completed with the substantially diastase-free extract of the germinated cereal produced in accordance with this invention and then to concentrate the combined extract or to mix such concentrated extracts in order to obtain an effective antioxygenic material.

Either one or both of these extracts may after concentration be mixed with fully water miscible or partly water miscible organic solvents such as, for example, acetone or alcohols and particularly the higher molecular weight aliphatic alcohols such as butyl alcohol, to precipitate and remove from such solution many extracted materials in order to purify and enhance the antioxygenic effect. If desired, it is also possible, although less preferable, to use a mixture of water and these organic solvents as extracting agents, preferably in slightly acidified condition. Or, on the other hand, the organic solvents themselves may be utilized as the extractant following which they may be evaporated to obtain the concentrate or mixed with water to precipitate therefrom materials not desired in the final antioxygenic concentrate.

The extract may also be prepared from the germinated or sprouted cereal germs such as wheat germ, oat germ, rice germ, and corn germ, which may contain a small quantity of the endosperm or other nutrient to be supplied to the germ during the sprouting or germinating operation. The extract of the sprouted or germinated germ prepared in this manner may be concentrated and utilized as an antioxidant for organic oxidizable compositions. Desirably, slightly acidified water and alcohol are employed as the solvents during the extraction procedure.

The seeds, such as soya, sesame and peanuts, and particularly the seed germs such as peanut germ may also be permitted to sprout and germinate and then extracted to produce an effective antioxygenic concentrate.

The present application is a continuation in part of applications, Serial No. 298,426, filed October 7, 1939, now Patent 2,232,555 and Serial No. 261,667 filed March 12, 1939, now Patent 2,181,765, and through said latter application continues the subject matter of application, Serial No. 229,664 filed September 13, 1938, now Patent 2,176,026.

Having described my invention, what I claim is:

1. A process of stabilizing a food composition subject to oxidative deterioration against such deterioration, which comprises adding thereto a relatively small amount of a product selected from the group consisting of the finely divided sprouted and germinated cereals, sprouted and germinated cereal germs and sprouted and germinated seeds and their water and alcohol soluble extracts.

2. A process of stabilizing a glyceride oil containing food composition subject to oxidative deterioration against such deterioration, which comprises adding thereto a relatively small amount of a product selected from the group consisting of the finely divided sprouted and germinated cereals, sprouted and germinated cereal germs and sprouted and germinated seeds and their water and alcohol soluble extracts.

3. A process of stabilizing a glyceride oil containing food composition subject to oxidative deterioration against such deterioration, which comprises adding thereto a relatively small amount of a finely divided sprouted and germinated cereal.

4. A process of stabilizing a glyceride oil containing food composition subject to oxidative deterioration against such deterioration, which comprises adding thereto a relatively small amount of the water soluble extract of a sprouted and germinated cereal, said extract having been prepared by extracting a finely divided germinated and sprouted cereal with slightly acidified water at a temperature of between 125° F. and 145° F., removing the water insoluble material and concentrating to between 45% and 75% total solids.

5. A food composition, substantially stabilized against oxidative deterioration, carrying and being stabilized by a relatively small amount of a product selected from the group consisting of the finely divided sprouted and germinated cereals, sprouted and germinated cereal germs and sprouted and germinated seeds and their water and alcohol soluble extracts.

6. A glyceride oil containing food composition, substantially stabilized against oxidative deterioration, carrying and being stabilized by a relatively small amount of a product selected from the group consisting of the finely divided sprouted and germinated cereals, sprouted and germinated cereal germs and sprouted and germinated seeds and their water and alcohol soluble extracts.

7. A glyceride oil containing food composition, substantially stabilized against oxidative deterioration, carrying and being stabilized by a relatively small amount of a finely divided sprouted and germinated cereal.

8. A glyceride oil containing food composition, substantially stabilized against oxidative deterioration, carrying and being stabilized by a relatively small amount of the slightly acidified water soluble extract of a finely divided sprouted and germinated cereal.

SIDNEY MUSHER.